United States Patent [19]

Branson et al.

[11] Patent Number: 4,907,189

[45] Date of Patent: Mar. 6, 1990

[54] CACHE TAG COMPARATOR WITH READ MODE AND COMPARE MODE

[75] Inventors: Brian D. Branson; Richard D. Crisp, both of Austin, Tex.

[73] Assignee: Motorola, Inc., Schaumburg, Ill.

[21] Appl. No.: 229,201

[22] Filed: Aug. 8, 1988

[51] Int. Cl.⁴ .......................... G06F 12/00; G11C 7/00
[52] U.S. Cl. ................................. 364/900; 365/189.07; 364/947; 364/947.2; 364/964; 364/964.2
[58] Field of Search .............................. 364/200, 900; 365/189.07

[56] References Cited

U.S. PATENT DOCUMENTS

| 4,349,871 | 9/1982 | Lary | 364/200 |
| 4,493,026 | 1/1985 | Olnowich | 364/200 |

OTHER PUBLICATIONS

Motorola MCM 62350, MCM 62351 Cache Tag Comparator, pp. 1-19.

Primary Examiner—Raulfe B. Zache
Attorney, Agent, or Firm—James L. Clingan, Jr.

[57] ABSTRACT

A cache TAG, which has a compare mode, an and/or/invert mode, and a read mode, has a programmable comparator which receives an external data signal and an output from an array of memory cells and provides an output to a secondary amplifier. The secondary amplifier provides an output to a match comparator in the compare mode and the and/or/invert mode and to an output buffer in the read mode. The programmable comparator is programmable according to the mode of the cache TAG. The compartor uses selectively enabled transmission gates which provide minimal delay in providing the appropriate data to the secondary sense amplifiers.

8 Claims, 2 Drawing Sheets

CACHE TAG COMPARATOR WITH READ MODE AND COMPARE MODE

FIELD OF THE INVENTION

The invention relates to cache TAG integrated circuits, and more particularly, to comparators used in a cache TAG.

BACKGROUND OF THE INVENTION

Cache TAGs have been found to substantially enhance performance of a processing system. The processing system has a processor which generates addresses which are requests for instructions or data. A cache TAG determines if the requested instruction or data is present in a cache memory which can rapidly provide the requested instruction or data. The cache TAG bases this determination upon the address which is provided by the processor. There may be more than one cache TAG integrated circuit used for this determination in which each cache TAG receives a portion of the provided address. The portion of the address received by each cache TAG integrated circuit is further divided into an index portion and a TAG portion. Normally, the index portion is common to all of the cache TAGs, and the TAG portion is unique to each cache TAG. Each cache TAG is substantially like a typical static random access memory (SRAM) in which the index portion acts like the address of the memoroy to which the memory responds by providing one or more bits of data which are compared to the TAG portion of the address. The data provided by the cache TAG is not the same as that requested by the processor. The present invention is directed to a cache TAG so that "data" as used herein will relate to the TAG portion of the address either as applied to the cache TAG or as provided by the cache TAG in response to an index. The whole address, which typically includes the index and all of the TAGs and may include some other information such as specific byte information, will be referred to as the system address. Information which is provided in response to the system address will be called "system data" and can include instructions.

In response to the index then, the cache TAG internally provides data comprised of a predetermined number of bits which are compared to the TAG portion of the address of a like number of bits. If the comparison indicates that they are the same, a match (or hit) signal is generated by the cache TAG. The performance of the cache TAG is to a large extent judged by the speed with which the cache TAG can provide the proper logic state of the match signal. There are two common specifications for stating this performance characteristic. The first is address valid to match valid (AVMV). The second is data valid to match valid (DVMV). The AVMV specification is for the case in which only the index is changed, i.e., data (the TAG) is not changed. The DVMV is for the case when only the data is changed, i.e., the address (the index) is not changed. The AVMV is always slower than the DVMV because a change in address requires an access to the array whereas a change in data does not. Thus, in general, the AVMV has been the limit in speed. Some processing systems have been designed to take advantage of the faster DVMV specification. Such designs introduce logic in the data path which cruses some additional delay for that path. As the cache TAGs have developed even faster speeds, the difference between the AVMV and DVMV has typically gotten to be less to the point where the added delay in the system exceeds the difference between AVMV and DVMV. In such a processing system then the data change is the slower cache access. Thus it is desirable that both the AVMV and DVMV specifications be optimized.

One of the functions which must be performed by a cache TAG is a compare of the data which is performed in a compare mode. There may be more than one compare mode. This compare function has been achieved with exclusive NOR logic which adds delay. The comparator which performs this function is in the critical path to the match output. Thus, any delay added by the comparator adds the same delay to the AVMV and DVMV specifications. Thus any reduction in the delay of the comparator improves both the AVMV and DVMV specifications. The number of exclusive NOR comparators is equal to the number of bits of data. Each exclusive NOR comparator thus determines if the single bit of data to which it corresponds is a match. There is then also a further determination that all of the bits, which correspond to the particular cache TAG, match before the match signal is generated by that cache TAG. This match comparator which generates the match signal is also in the critical speed path. Another function which must also must be performed quickly is an output of the data which is provided in a read mode. This is a different mode of operation from the compare mode. The output of data in response to an address is also an important specification for which it is desirable that the compare function not impede. This has resulted in the read path (the data out path) divert from the compare path before reaching the comparator.

Another function which it has been found desirable to provide is an and/or/invert function. This has been useful for providing flexibility to the integrated circuit. In a processing system which has a cache, not only must the system address be compared but there must also be verification that the stored system data is valid. The cache system includes circuitry for providing valid bits to indicate if the stored system data which corresponds to the matched system address is valid. The and/or/invert function provides for this capability. This aids the manufacturer of the processing system by reducing the number of different integrated circuit types required for making the processing system. In providing this and/or/invert function, it is also desirable that no additional time be added to the read and compare functions.

SUMMARY OF THE INVENTION

Accordingly, it is an object of the present invention to provide an improved cache TAG.

It is another object of the present invention to provide a cache TAG having a comparator in an improved location in the data path.

It is yet another object of the invention to provide a cache TAG with an improved comparator.

In carrying out these and other objects of the invention, there is provided, in one form, a cache TAG having an array of bits from which a predetermined number of bits are selected in response to an address for providing a plurality of bit signals representative of corresponding logic states of the selected bits, a read mode for providing, external to the cache TAG, data output signals respresentative of the logic states of the selected bits, and a compare mode for comparing the logic states of the selected bits to logic states of a plurality of input data signals of the predetermined number. The cache TAG has a plurality of comparators of the predetermined number, a plurality of secondary sense amplifiers of the predetermined number, a plurality of output buffers of the predetermined number, and a match comparator. Each comparator of the plurality of comparators receives a corresponding bit signal and a corresponding data input signal and provides, when the cache TAG is in the compare mode, a compare signal at a first logic state if the logic state represented by the received bit signal is the same as the logic state of the corresponding data input signal and at a second logic state if the logic state represented by the received bit signal is not the same as the logic state of the corresponding data input signal and provides, when the cache TAG is in the read mode, the compare signal at the logic state representative of the corresponding bit signal. Each of the plurality of secondary sense amplifiers corresponds to a particular one of the plurality of comparators and has an input for receiving the compare signal of the corresponding comparator and provides an amplified output signal representative of the logic state of the compare signal of the corresponding comparator. The match comparator is coupled to the amplified output signals of the plurality of secondary sense amplifiers provides, when the cache TAG is in the compare mode, a match signal external to the cache TAG to indicate if all of the amplified output signals are representative of the compare output signals being in the first logic state. Each output buffer of the plurality of output buffers corresponds to a particular secondary sense amplifier and provides, when the cache TAG is in the read mode, the data output signal at a logic state representative of the logic state represented by the amplified output signal of the corresponding secondary sense amplifier.

DETAILED DESCRIPTION OF THE INVENTION

Figure 1:
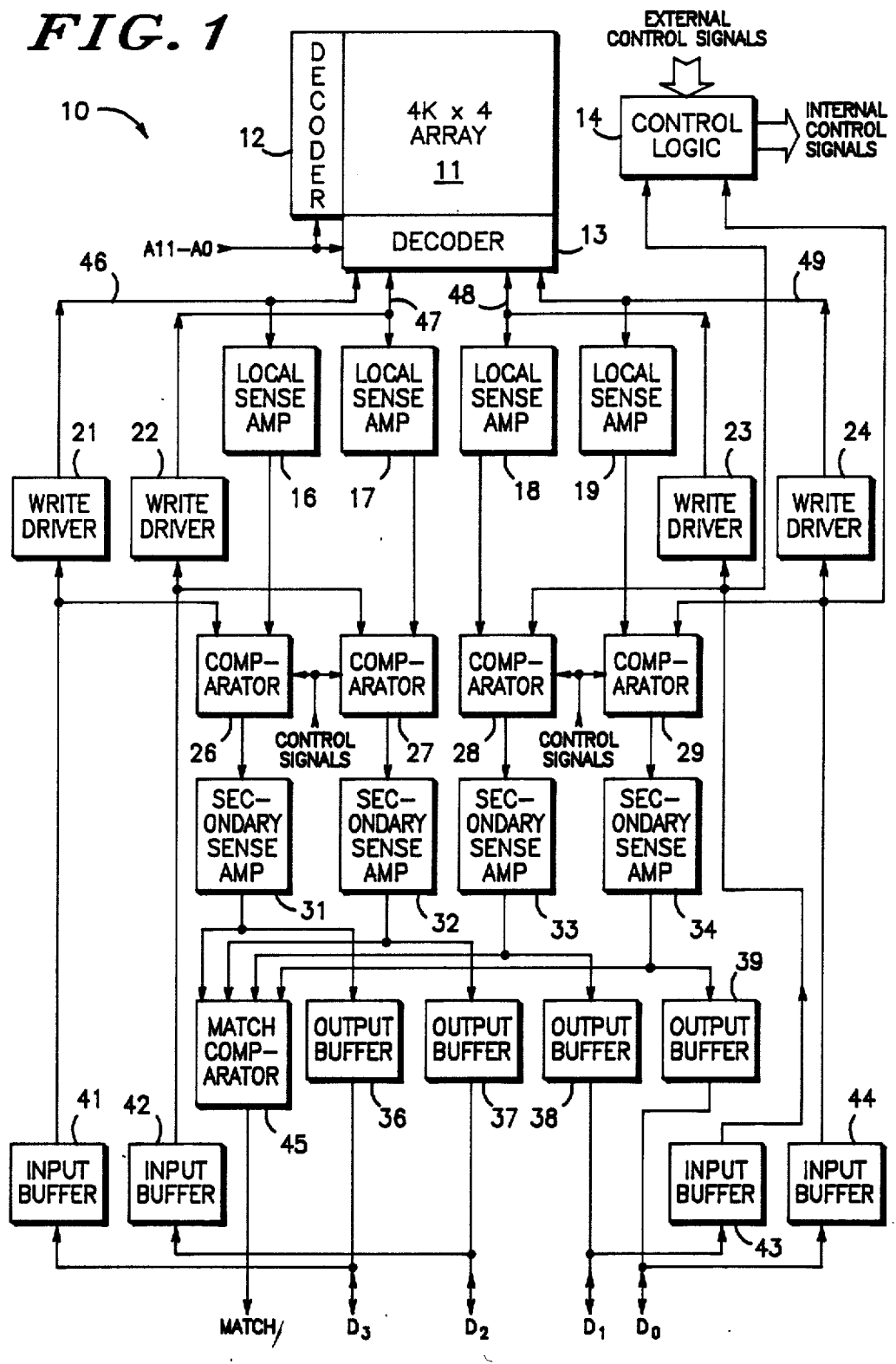
FIG. 1 is a block diagram of a cache TAG according to a preferred embodiment of the invention.

The invention will now be described in more detail with reference to the various figures. Shown in FIG. 1 is a cache TAG 10 comprised of an array 11; a decoder 12; a decoder 13; control logic 14; local sense amplifiers 16, 17, 18, and 19; write drivers 21, 22, 23, and 24; comparators 26, 27, 28, and 29; secondary sense amplifiers 31, 32, 33, and 34; output buffers 36, 37, 38, and 39; input buffers 41, 42, 43, and 44; and match comparator 45. In response to address signals $A_{11}$-$A_0$, decoders 12 and 13 select four bits from array 11. Address signals $A_{11}$-$A_0$ comprise an index for cache TAG 10. The selected four bits are data which, in a compare mode of cache TAG 10, are to be compared to a TAG which is received as data signals $D_3$, $D_2$, $D_1$, and $D_0$ received by input buffers 41-44, respectively. Local sense amplifiers 16-19 receive a signal from the four selected data bits via data lines 46, 47, 48, and 49, respectively. Local sense amplifiers 16-19 output amplified signals representative of the logic state of the four selected bits to comparators 26-29 except in a write mode. Input buffers 41-44 output buffered data signals $D_3$-$D_0$ to write drivers 21-24 which, in the write mode, drive the logic state of the corresponding data signals $D_3$-$D_0$ onto data lines 46-49. The particular mode of cache TAG 10 is determined by external control signals received by control logic 14 which responds by generating internal control signals which control various elements of cache TAG 10. Because the operation of cache TAG 10 is, except for comparators 26-29, relatively normal, elements other than comparators 26-29 do not show that they receive control signals.

In a compare mode in which a match signal is to be generated at a logic high if signals $D_3$-$D_0$ are the same, i.e., the same logic state, as the bits selected by address signals $A_{11}$-$A_0$, comparators 26-29 perform an exclusive NOR function. If the logic state of the output of local sense amplifier 16 is the same as that of the output of input buffer 41, comparator 26 outputs a logic high to secondary sense amplifier 31. Similarly for comparators 27-29, if the outputs of the corresponding local sense amplifiers 17-19 are the same as the outputs of corresponding input buffers 42-44, comparators 27-29 output logic highs to secondary sense amplifiers 32-34, respectively. Secondary sense amplifiers 31-34 provide amplification and output logic states the same as that received to match comparator. If all of secondary sense amplifiers 31-34 provide logic high outputs to match comparator 45, match comparator 45 outputs the match signal as a logic high to indicate that signals $D_3$-$D_0$ are the same as the bits selected by address signals $A_{11}$-$A_0$.

In the read mode comparators 26-29 pass the outputs of local sense amplifiers 16-19 to secondary sense amplifiers 31-34, respectively, which amplify the outputs of local sense amplifiers 16-19. Secondary sense amplifiers 31-34 output the amplified signals to output buffers 36-39, respectively, which in turn output signals $D_3$-$D_0$ representative of the bits selected by address signals $A_{11}$-$A_0$. In the write mode, inputs buffers 41-44 receive signals $D_3$-$D_0$, respectively, and output the same logic state as that received to write drivers 21-24, respectively. Write drivers 21-24 drive the logic state received onto data lines 46-49 which causes the four bits selected by address signals $A_{11}$-$A_0$ to be written to the same logic state as signals $D_3$-$D_0$.

In the and/or/invert mode, as in the exclusive NOR compare mode, comparators 26-29 receive data signals $D_3$-$D_0$, respectively, and the outputs of local sense amplifiers 16-19, respectively. In the and/or/invert mode each comparator passes the output of its corresponding local sense amplifier to its corresponding secondary sense amplifier if its corresponding data signal input is a logic high and provides a logic high output if its corresponding data signal is a logic low. If, for example, data signal $D_3$ is a logic high, comparator 26 passes the output of local sense amplifier 16 to secondary sense amplifier 31. If, on the other hand, data signal $D_3$ is a logic low, comparator 26 outputs a logic high to secondary sense amplifier 31 regardless of the logic state of the output of sense amplifier 16. Secondary sense amplifiers 31-34 amplify the signals received from comparators 26-29, respectively and output the logic state received to match comparator 45. Match comparator 45 outputs the match signal at a logic high if all of secondary sense amplifiers 31-34 output a logic high. If one or more of secondary sense amplifiers 31-34 provide a logic low output, match comparator 45 provides a logic low output. This is a useful mode when cache TAG 10 is used for storing valid bits. The bit of the four bits which is being interrogated for its indication of validity is selected by having its corresponding data signal be at a logic high with the other three at a logic low. This forces three of the four inputs to match comparator 45 to a logic high with the fourth input being the same logic state as the stored bit which corresponds to the data signal which is a logic high. The match signal is then provided at a logic high if the selected bit is a logic high and at a logic low if the selected bit is a logic low. Match comparator 45 functions as an AND gate. Each of comparators 26-29 function as an OR gate with an inverting input for data signals $D_3$-$D_0$, respectively.

The location of comparators 26-29 is advantageous to the location of comparators in cache TAGs of the prior art In the data out path of the prior art, the comparators followed the secondary sense amplifiers so that secondary sense amplifiers output signals to both the output buffers such as output buffers 36-39 and the individual comparators such as comparators 26-29. Comparators in that location received signals which were full power supply signals so that the comparators added significant delay. Comparators 26-29 are manipulating signals at much lower voltage levels and add very little delay. This improves the address valid to match valid (AVMV) specification. The data valid to match valid (DVMV) specification can also be optimized because the comparator adds so little delay.

Figure 2:
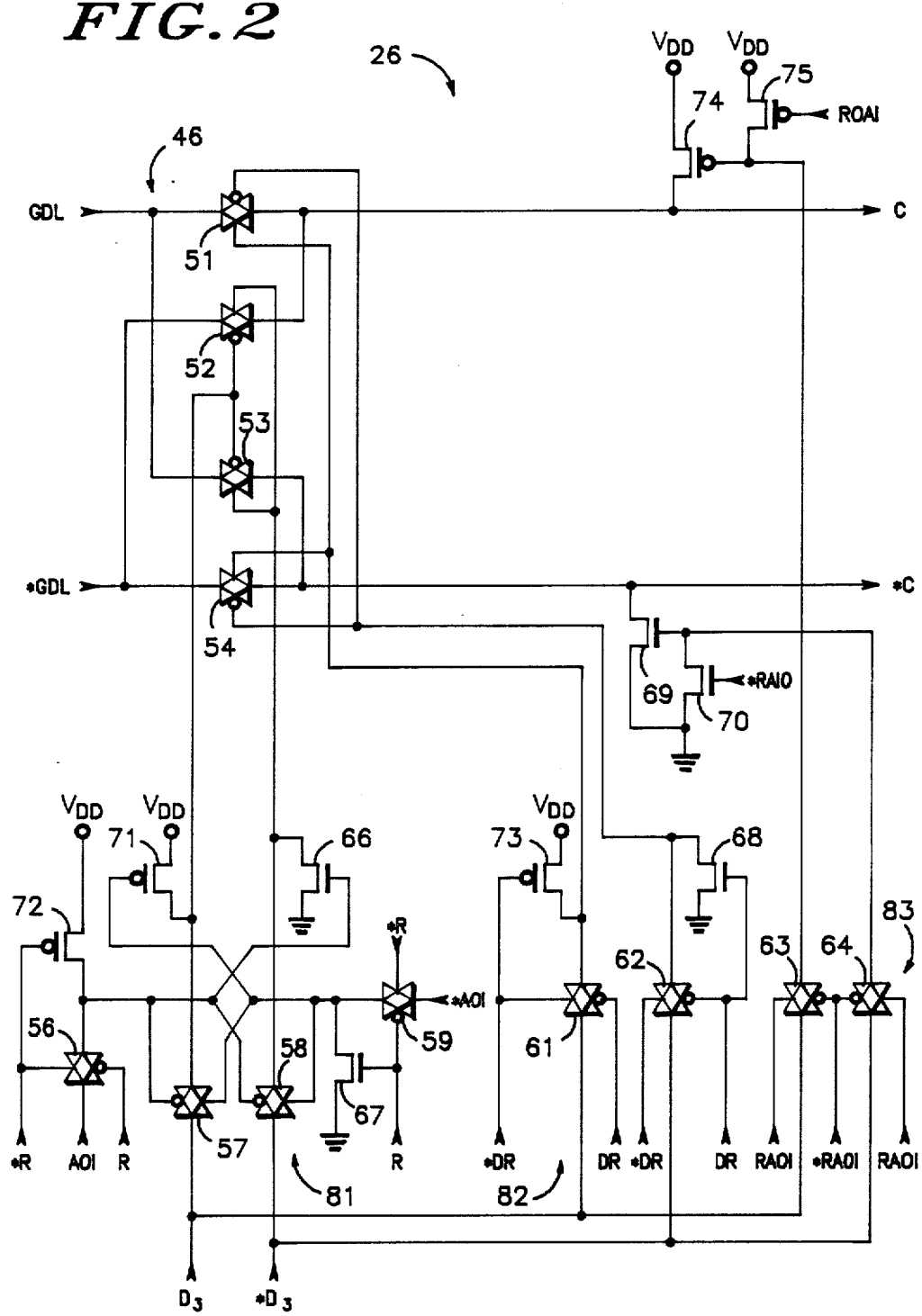
FIG. 2 is a circuit diagram of a comparator according to a preferred embodiment of the invention useful in the cache TAG of FIG. 1.

Shown in FIG. 2 is a circuit diagram of comparator 26 comprised of CMOS transmission gates 51, 52, 53, 54, 56, 57, 58, 59, 61, 62, 63, and 64; N channel transistors 66, 67, 68, 69, and 70; and P channel transistors 71, 72, 73, 74, and 75. As shown in FIG. 1, comparator 26 receives a signal from local sense amplifier 16 via data line 46. Local sense amplifier actually outputs complementary signals representative of the logic state of the selected bit which is coupled to local sense amplifier 16. Data line 46 is actually a pair of lines which carry the complementary outputs to comparator 26. As shown in FIG. 2, data line 46 comprises a true data line GDL and complementary data line *GDL. Each of transmission gates 51-54, 56-59, and 61-64 has a data input, a data output, a true control input, and a complementary control input. Transmission gate 51 has its data input coupled to data line GDL and thus to local sense amplifier 16, its data output for providing a true compare output C coupled to secondary sense amplifier 31, its true control input coupled to the data output of transmission gate 61, and its complementary control input coupled to the data output of transmission gate 62. Transmission gate 52 has its data input coupled to complementary data line *GDL, its data output for providing compare output C and coupled to secondary sense amplifier 31, its true control input coupled to the data output of transmission gate 58, and its complementary control input coupled to the data output of transmission gate 57. Transmission gate 53 has its data input coupled to data line GDL, its data output for providing a complementary compare output *C and coupled to secondary sense amplifier 31, its true control input coupled to the data output of transmission gate 58, and its complementary control input coupled to the data output of transmission gate 57. Transmission gate 54 has its data input coupled to data line *GDL, its data output for providing compare signal *C and coupled to secondary sense amplifier 31, its true control input coupled to the data output of transmission gate 61, and its complementary control input coupled to the data output of transmission gate 62.

Transmission gate 57 has its data input for receiving data input signal $D_3$ via input buffer 42 shown in FIG. 2. FIG. 2 shows the output of input buffer 41 as a single line. The line is representative of carrying a logic state representative of received signal $D_3$. The output of input buffer 41 representative of the logic state of signal $D_3$ is provided with complementary signals as shown in FIG. 2 as signals $D_3$ and *$D_3$. The data input of transmission gate 58 receives signal *$D_3$ and is thus coupled to input buffer 41. Transmission gate 57 has its true control input coupled to the data output of transmission gate 56, and its complementary control input coupled to the data output of transmission gate 59. Transmission gate 58 has its true control input coupled to the data output of transmission gate 59, and its complementary control input coupled to the data output of transmission gate 56. Transmission gate 56 has its data input for receiving an and/or/invert signal AOI, its true control input for receiving a complementary read signal *R, and its complementary control input for receiving a true read signal R. Transmission gate 59 has its data input for receiving a complementary and/or/invert signal *AOI, its true control input for receiving signal *R, and its complementary control input for receiving signal R. Signals AOI, *AOI, R, and *R are provided by control logic 14 shown in FIG. 1. The particular mode or configuration of cache TAG 10 is determined by external control signals and by signals $D_1$ and $D_0$. The implementation of the mode or configuration is achieved by the internal control signals generated by control logic 14. Transistor 72 has a source connected to a positive power supply terminal VDD for receiving a power supply voltage such as 5 volts, a gate for receiving signal *R, and a drain connected to the complementary control inputs of transmission gates 57 and 58. Transistor 71 has source connected to VDD, a gate connected to the data output of transmission gate 59, and a drain connected to the data output of transmission gate 57. Transistor 66 has a source connected to a negative power supply terminal such as ground, a gate connected to the data output of transmission gate 56, and a drain connected to the data output of transmission gate 57. Transistor 67 has a source connected to ground, a gate for receiving signal R, and a drain connected to the true control inputs of transmission gates 57 and 58.

Transmission gate 61 has its data input for receiving signal $D_3$ via input buffer 41, its true control input for receiving complementary delayed read signal *DR from control logic 14, and its complementary input for receiving true delayed signal DR from control logic 14. Transmission gate 62 has its data input for receiving signal *$D_3$ from input buffer 41, its true control input for receiving signal *DR, and its complementary control input for receiving signal DR. Transistor 73 has source connected to VDD, a gate for receiving signal *DR, and a drain connected to true control inputs of transmission gates 51 and 54. Transistor 68 has a source connected to ground, a gate for receiving signal DR, and a drain connected to the complementary control inputs of transmission gates 51 and 54.

Transmission gate 63 has its data input for receiving signal $D_3$ from input buffer 41, its true control input for receiving a true read-controlled and/or invert signal RAOI, and its complementary control input for receiving a complementary read-controlled and/or/invert signal *RAOI. Transmission gate 64 has its data input for receiving signal *$D_3$ from input buffer 41, its true control input for receiving signal RAOI, and its complementary control input for receiving signal *RAOI. Transistor 69 has drain for providing compare output *C, source connected to ground, and a gate connected to the data output of transmission gate 64. Transistor 70 has drain connected to the gate of transistor 69, a gate for receiving signal *RAOI, and a source connected to ground. Transistor 74 has source connected to VDD, a gate connected to the data output of transmission gate 63, and a drain connected to compare output C. Transistor 75 has a drain connected to the gate of transistor 74, a source connected to VDD, and a gate for receiving signal RAOI.

In the compare mode, signals AOI and RAOI are a logic low, signals *AOI and *RAOI are a logic high, signals R and DR are a logic low, and signals *R and *DR are a logic high. Signals R and DR are nearly the same. The only difference is that a change in logic state is delayed slightly for signal DR. This allows transmission gate pairs 51, 54 and 52, 53 to alternately drive signals C and *C with minimal drive timing overlap. Signals AOI and RAOI are also nearly the same except that signal RAOI is a logic low if signal R is a logic high. In the compare mode then, transmission gates 56, 57, 58, 59, 61 and 62 are enabled. With transmission gates 57, 58, 61, and 62 enabled, the true control inputs of transmission gates 51 and 54 receive signal $D_3$, the complementary control inputs of transmission gates 51 and 54 receive signal *$D_3$, the true control inputs of transmission gates 52 and 53 receive signal *$D_3$, and the complementary control inputs of transmission gates receive signal $D_3$. Thus if data signal $D_3$ is a logic high, transmission gates 51 and 54 are enabled and transmission gates 52 and 53 are disabled. If data signal $D_3$ is a logic low, transmission gates 52 and 53 are enabled and transmission gates 51 and 54 are disabled. For the case in which data signal $D_3$ is a logic high, transmission gate 51 couples data line GDL to compare output C. If local sense amplifier 16 is providing a logic high output, then output C will be a logic high. Output C, as the true output of comparator 26, at a logic high indicates that the selected bit and data input signal $D_3$ are the same. Thus transmission gate 51 passing the logic high of GDL to output C for the case when signal $D_3$ is a logic high is the correct response. Similarly, transmission gate 51 also will pass a logic low to output C if local sense amplifier 16 outputs a logic low. Thus output C indicates at a logic low, properly, that the selected bit and data signal $D_3$ are not the same logic state. Transmission gate 54 similarly passes the complementary logic state of the selected bit to output *C to indicate the same result. For the case in which data signal $D_3$ is a logic low, output C should be a logic low if data line GDL is a logic high and should be a logic high if data line GDL is a logic low. This is achieved by enabling transmission gates 52 and 53 with signals $D_3$ and *$D_3$ at a logic low and a logic high, respectively. This couples the complementary data line *GDL to the true output C and the true data line GDL to the complementary output *C. Thus, compare output C is properly provided at a logic high if the complementary data line *GDL is a logic high and properly provided at a logic low if the complementary data line *GDL is a logic low.

In the read mode signals R and DR are a logic high which causes signal RAOI to be a logic low and signal *RAOI to be a logic high. With signal R at a logic high and signal *R at a logic low, transistors 67 and 72 are conductive and transmission gates 56 and 59 are disabled. Transistors 67 and 72 being conductive causes transmission gates 57 and 58 to be disabled and transistors 66 and 71 to be conductive. Transistors 66 and 71 being conductive causes transmission gates 52 and 53 to be disabled. Signal DR being a logic high and signal *DR being a logic low cause transmission gates 61 and 62 to be disabled and transistors 68 and 73 to be conductive. With transistors 68 and 73 conductive, transmission gates 51 and 54 are enabled. This causes the signals on data lines GDL and *GDL to be coupled to outputs C and *C, respectively, regardless of the logic states of signals $D_3$ and *$D_3$. Signal RAOI being a logic low and signal *RAOI being a logic high cause transmission gates 63 and 64 to be disabled and transistors 70 and 75 to be conductive. Trasistors 70 and 75 being conductive cause transistors 69 and 74 to be non-conductive. Thus, the signals present on data lines GDL and *GDL pass to secondary sense amplifier 31 for further amplification.

Transmission gates 51 and 54 cause very little delay. In the read mode the outputs of local sense amplifiers 16-19 pass through comparators 26-29 with only negligible delay. Thus, the specification for the read time of cache TAG 10 is not increased because of comparators 26-29. The output of local sense amplifiers 16-19 begin at a voltage which is about half way between VDD and ground. The voltage difference between the true and complementary outputs develops relatively slowly. Secondary sense amplifiers are outputting signals at or near VDD and ground well before the outputs of local sense amplifiers 16-19 are outputting signals at or near VDD and ground. Thus, during the critical time that secondary sense amplifiers 31 and 34 are first sensing the outputs of local sense amplifiers 16-19, neither the true nor the complementary outputs of local sense amplifiers 16-19 are near VDD or ground. During this critical sensing time, transmission gates 51 and 54 drop very little voltage and also provide the logical compare function outputs to match comparator 45 before the outputs of local sense amplifier 16 have reached the full VDD and ground levels. Comparators of the prior art used in cache TAGs used active logic such as NAND gates and NOR gates. One disadvantage of these types is that they had series transistors between the output and either VDD or ground. This caused substantially more delay than comparator 26 which uses transmission gates to coupled low level signals between the local sense amplifier and the secondary sense amplifier. The location of the comparator, while offering an advantage with respect to the compare-function speed specification, does not disadvantageously affect the read-function speed specification. The compare function speed from a transiston of data signal $D_3$ is also fast due to the minimum amount of delay from externally received signal $D_3$ and the control inputs of transmission gates 51-54 and the gates of transistors 69 and 74.

In the and/or/invert mode, signals R and DR are a logic low, signals *R and *DR are a logic high, signals AOI and RAOI are a logic high, and signals *AOI and *RAOI are a logic low. Signal R being a logic low and signal *R being a logic high causes transmission gates 56 and 59 to be enabled and transistors 67 and 72 to be non-conductive. Transmission gates 56 and 59 being enabled, signal AOI being a logic high, and signal *AOI being a logic low causes transmission gates 57 and 58 to be disabled, transistors 66 and 71 to be conductive, and thus transmission gates 52 and 53 to be disabled. Signal DR being a logic low and signal *DR being a logic high causes transmission gates 61 and 62 to be enabled and transistors 68 and 73 to be non-conductive. Transmission gates 61 and 62 being enabled causes transmission gates 51 and 54 to be selectively enabled in response to the signals $D_3$ and *$D_3$. If signal $D_3$ is a logic high and signal *$D_3$ is a logic low, transmission gates 51 and 54 are enabled. If signal $D_3$ is a logic low and signal $*D_3$ is a logic high, transmission gates 51 and 54 are disabled. Signal RAOI being a logic high and *RAOI being a logic low causes transmission gates 63 and 64 to be enabled and transistors 70 and 75 to be non-conductive. Transmission gates 63 and 64 being enabled makes the conductivity of transistors 69 and 74 dependent on the logic states of signals $*D_3$ and $D_3$, respectively. If signal $D_3$ is a logic high and signal $*D_3$ is a logic low, transistors 69 and 74 are non-conductive. If signal $D_3$ is a logic low and signal $*D_3$ is a logic high, transistors 69 and 74 are conductive. Thus, if data signal $D_3$ is a logic low, compare output C is caused by the conductivity of transistor 74 to be a logic high and compare output *C is caused by the conductivity of transistor 69 to be a logic low. If, on the other hand, data signal $D_3$ is a logic high, transmission gates 51 and 54 couple the output of local sense amplifier 16 to secondary sense amplifier 31. Thus in the and/or/invert mode, data signal $D_3$ at a logic high causes the logic state of the selected bit which is coupled to local sense amplifier to be coupled to match comparator 45, and data signal $D_3$ at a logic low causes the input to match comparator 45 which corresponds to the signal $D_3$ to be a logic high.

Comparator 26 has three different operating modes for implementing the compare function, the read function, and the and/or/invert function of cache TAG 10. Transmission gates 57 and 58 operate as a pair 81 which, when enabled, allow transmission gates 52 and 53 to be selectively enabled as determined by the logic state of signal $D_3$. Transmission gates 61 and 62 operate as a pair 82 which, when enabled, allow transmission gates 51 and 54 to be selectively enabled as determined by the state of data signal $D_3$. In the compare mode, both pairs 81 and 82 are enabled so that the logic high state of data signal $D_3$ causes transmission gates 51 and 54 to be enabled and the logic low state of signal $D_3$ causes transmission gates 52 and 53 to be enabled. In the read mode, pairs 81 and 82 are disabled and transistors 68 and 73 cause transmission gates 54 and 51 to be enabled and transistors 66, 67, 71, and 72 cause transmission gates 52 and 53 to be disabled. Thus pairs 81 and 82 and transistors 66, 67, 68, 71, and 73 cause the logic state of local sense amplifier 16 to be coupled to secondary sense amplifier 31 in the read mode and cause transmission gates 51-54 to be responsive to the logic state of data signal $D_3$ in the compare mode. Transmission gates 56, 59, 63, and 64 and transistors 69, 70, 74, and 75 are for use in the and/or/invert mode in which either transmission gates 51 and 54 couple the logic state of the selected bit which corresponds to comparator 26 to secondary sense amplifier 31 if signal $D_3$ is a logic high or comparator 26 provides a logic high output to secondary sense amplifier 31.

Cache TAG 10 thus provides advantages over the prior art by the location of comparators 26-29 and by the particular circuit of comparators 26-29. The combination of the comparator and location is also advantageous because the comparator design is particularly effective in the use of low level input signals.

While the invention has been described in a specific embodiment, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

We claim:

1. A cache TAG having an array of bits from which a predetermined number of bits are selected in response to an address for providing a plurality of bit signals representative of corresponding logic states of the selected bits, a read mode for providing, external to the cache TAG, data output signals representative of the logic states of the selected bits, and a compare mode for comparing the logic states of the selected bits to logic states of a plurality of input data signals of the predetermined number, comprising:

a plurality of comparators of the predetermined number, each comparator for receiving a corresponding bit signal and a corresponding data input signal and for providing, when the cache TAG is in the compare mode, a compare signal at a first logic state if the logic state represented by the received bit signal is the same as the logic state of the corresponding data input signal and at a second logic state if the logic state represented by the received bit signal is not the same as the logic state of the corresponding data input signal and for providing, when the cache TAG is in the read mode, the compare signal at the logic state representative of the corresponding bit signal;

a plurality of secondary sense amplifiers of the predetermined number, each having an input for receiving the compare signal of a corresponding comparator and providing an amplified output signal representative of the logic state of the compare signal of the corresponding comparator;

a match comparator, coupled to the plurality of secondary sense amplifiers, for providing, when the cache TAG is in the compare mode, a match signal external to the cache TAG to indicate if the amplified output signal provided by each secondary sense amplifier representative of each compare signal being in the first logic state; and a plurality of output buffers of the predetermined number, coupled to the plurality of secondary sense amplifiers, each for providing, when the cache TAG is in the read mode, a data output signal at a logic state representative of the logic state represented by the amplified output signal of a corresponding secondary sense amplifier.

2. The cache TAG of claim 1 wherein each bit signal of the plurality of bit signals comprises a true bit signal and a complementary bit signal, wherein each secondary sense amplifier has a true input and a complementary input, and wherein each comparator comprises:

first coupling means for coupling the true bit signal of the corresponding bit signal to the true input of a corresponding one of the plurality of secondary sense amplifiers when the cache TAG is in the read mode or when both the cache TAG is in the compare mode and the corresponding data input signal is in the first logic state;

second coupling means for coupling the true bit signal of the corresponding bit signal to the complementary input of the corresponding one of the plurality of secondary sense amplifiers when both the cache TAG is in the compare mode and the data input signal is in the second logic state;

third coupling means for coupling the complementary bit signal of the corresponding bit signal to the complementary input of the corresponding one of the plurality of secondary sense amplifiers when the cache TAG is in the read mode or when both the cache TAG is in the compare mode and the corresponding data input signal is in the first logic state; and fourth coupling means for coupling the complementary bit signal of the corresponding bit signal to the true input of the corresponding one of the plurality of secondary sense amplifiers when both the cache TAG is in the compare mode and the data input signal is in the second logic state.

3. The cache TAG of claim 2 wherein the first, second, third, and fourth coupling means are CMOS transmission gates.

4. The cache TAG of claim 1 further characterized as having an and/or/invert mode wherein:

each comparator is further characterized as providing, when the cache TAG is in the and/or/invert mode, the compare signal at the first logic state when the corresponding data input signal is in the second logic state and at the logic state of the corresponding bit signal when the corresponding data input signal is in the first logic state; and the match comparator is further characterized as providing, when the cache TAG is in the and/or/invert mode, the match signal to indicate if the compare signals are in the first logic state.

5. The cache TAG of claim 4 wherein each bit signal of the plurality of bit signals comprises a true bit signal and a complementary bit signal, wherein each secondary sense amplifier has a true input and a complementary input, and wherein each comparator comprises:

first coupling means for coupling the true bit signal of the corresponding bit signal to the true input of a corresponding one of the plurality of secondary sense amplifiers when the cache TAG is in the read mode or when both the cache TAG is in the compare mode and the corresponding data input signal is in the first logic state or when both the cache TAG is in the and/or/invert mode and the corresponding data input signal is in the first logic state;

second coupling means for coupling the true bit signal of the corresponding bit signal to the complementary input of the corresponding one of the plurality of secondary sense amplifiers when both the cache TAG is in the compare mode and the data input signal is in the second logic state;

third coupling means for coupling the complementary bit signal of the corresponding bit signal to the complementary input of the corresponding one of the plurality of secondary sense amplifiers when the cache TAG is in the read mode or when both the cache TAG is in the compare mode and the corresponding data input signal is in the first logic state or when both the cache TAG is in the and/or/invert mode and the corresponding data input signal is in the first logic state;

fourth coupling means for coupling the complementary bit signal of the corresponding bit signal to the true input of the corresponding one of the plurality of secondary sense amplifiers when both the cache TAG is in the compare mode and the data input signal is in the second logic state;

first output control means, coupled to the corresponding one of the plurality of secondary sense amplifiers, for providing a true control signal at the first logic state to the true input of the corresponding secondary sense amplifier when both the cache TAG is in the and/or/invert mode and the data input signal is in the second logic state; and second output control means, coupled to the corresponding one of the plurality of secondary sense amplifiers, for providing a complementary control signal at the second logic state to the complementary input of the corresponding one of the plurality of secondary sense amplifiers when both the cache TAG is in the and/or/invert mode and the data input signal is in the second logic state.

6. A cache TAG having an array of bits from which a predetermined number of bits are selected in response to an address for providing a plurality of bit signals representative of corresponding logic states of the selected bits, a read mode for providing, external to the cache TAG, data output signals representative of the logic states of the selected bits, and a compare mode for comparing the logic states of the selected bits to logic states of a plurality of input data signals of the predetermined number, comprising:

a plurality of comparators of the predetermined number, each comparator for receiving a corresponding bit signal and a corresponding data input signal and for providing, when the cache TAG is in the compare mode, a compare signal at a first logic state if the logic state represented by the received bit signal is the same as the logic state of the corresponding data input signal and at a second logic state if the logic state represented by the received bit signal is not the same as the logic state of the corresponding data input signal and for providing, when the cache TAG is in the read mode, the compare signal at the logic state representative of the corresponding bit signal; and output means, coupled to the plurality of comparators, for providing, when the cache TAG is in the compare mode, a match signal to indicate if all of the amplified output signals are representative of the compare output signals being in the first logic state and for providing, when the cache TAG is in the read mode, the data output signals at the logic states representative of the selected bits as indicated by the compare signals.

7. A cache TAG having an array of bits from which a predetermined number of bits are selected in response to an address for providing a plurality of pairs of true and complementary bit signals representative of corresponding logic states of the selected bits and a compare mode for comparing the logic states of the selected bits to logic states of a plurality of input data signals of the predetermined number, comprising:

a plurality of comparators each corresponding to a particular pair of the pair of true and complementary bit signals and to a particular input data signal of the plurality of input data signals, each comparator comprising:

a true output;

a complementary output;

first coupling means for coupling the true bit signal of the corresponding pair of bit signals to the true output when the corresponding input data signal is in a first logic state;

second coupling means for coupling the true bit signal to the complementary output when the corresponding input data signal is in a second logic state;

third coupling means for coupling the complementary bit signal to the complementary output when the corresponding input data signal is in the first logic state; and fourth coupling means for coupling the complementary bit signal to the true output when the corresponding input data signal is in the second logic state;

a plurality of secondary sense amplifiers each corresponding to a particular one of the comparators and having a pair of inputs coupled to the true and complementary outputs of the corresponding comparator and an output; and a match comparator, coupled to the outputs of the plurality of secondary sense amplifiers, which provides a match signal if the outputs of the plurality of secondary sense amplifiers are all in a predetermined logic state.

8. A cache TAG having an array of bits from which a predetermined number of bits are selected in response to an address for providing a plurality of pairs of true and complementary bit signals representative of corresponding logic states of the selected bits, an and/or/invert mode, and a compare mode for comparing the logic states of the selected bits to logic states of plurality of input data signals of the predetermined number, comprising:

a plurality of comparators each corresponding to a particular pair of the pair of true and complementary bit signals and to a particular input data signal of the plurality of input data signals, each comparator comprising:

a true output;
a complementary output;
first coupling means for coupling the true bit signal of the corresponding pair of bit signals to the true output when the corresponding input data signal is in a first logic state;

second coupling means for coupling the true bit signal to the complementary output when both the cache TAG is in the compare mode and the corresponding input data signal is in a second logic state;

third coupling means for coupling the complementary bit signal to the complementary output when the corresponding input data signal is in the first logic state;

fourth coupling means for coupling the complementary bit signal to the true output when both the cache TAG is in the compare mode and the corresponding input data signal is in the second logic state;

first output control means, coupled to the true output, for providing a true control signal at the first logic state to the true output when both the cache TAG is in the and/or/invert mode and the data input signal is in the second logic state; and second output control means, coupled to the complementary output, for providing a complementary control signal at the second logic state to the 'complementary output when both the cache TAG is in the and/or/invert mode and the data input signal is in the second logic state;

a plurality of secondary sense amplifiers each having a pair of inputs coupled to the true and complementary outputs of a corresponding comparator and an output; and a match comparator, coupled to the outputs of the plurality of secondary sense amplifiers, which provides a match signal if the outputs of the plurality of secondary sense amplifiers are all in a predetermined logic state.

* * * * *